(12) United States Patent
Jin et al.

(10) Patent No.: US 8,576,356 B2
(45) Date of Patent: Nov. 5, 2013

(54) LIQUID CRYSTAL DISPLAY DEVICE WITH CONTROLLED VIEWING ANGLE PANEL AND DRIVING METHOD THEREOF

(75) Inventors: Hyun Suk Jin, Gunpo-Si (KR); Hyung Seok Jang, Seongnam-Si (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 13/087,955

(22) Filed: Apr. 15, 2011

(65) Prior Publication Data

US 2011/0194050 A1 Aug. 11, 2011

Related U.S. Application Data

(62) Division of application No. 11/453,935, filed on Jun. 16, 2006, now Pat. No. 7,948,582.

(30) Foreign Application Priority Data

Oct. 13, 2005 (KR) .......................... 10-2005-0096593

(51) Int. Cl.
*G02F 1/1347* (2006.01)
*G02F 1/13* (2006.01)

(52) U.S. Cl.
USPC .................... 349/75; 349/74; 349/76; 349/77; 349/78; 349/81; 349/194; 349/195

(58) Field of Classification Search
USPC ......... 349/123–130, 132, 141–144, 186–187, 349/74–77, 81, 194, 195
See application file for complete search history.

(56) References Cited

U.S. PATENT DOCUMENTS

| 5,570,211 A | 10/1996 | Hanaoka et al. |
| 5,592,314 A | 1/1997 | Ogasawara et al. |
| 5,680,184 A | 10/1997 | Nishino |
| 5,719,650 A * | 2/1998 | Wefers et al. .................... 349/74 |
| 5,757,455 A | 5/1998 | Sugiyama et al. |
| 6,356,329 B1 * | 3/2002 | Tamatani et al. ............. 349/141 |
| 6,600,527 B1 * | 7/2003 | Basturk et al. .................. 349/74 |
| 6,697,131 B2 | 2/2004 | Takami et al. |
| 6,903,784 B1 | 6/2005 | Basturk |
| 2005/0190329 A1 | 9/2005 | Okumura |

FOREIGN PATENT DOCUMENTS

| CN | 1661421 A | 8/2005 |
| JP | 2001296546 A | 10/2001 |

* cited by examiner

*Primary Examiner* — Hoan C Nguyen
(74) *Attorney, Agent, or Firm* — Birch, Stewart, Kolasch & Birch, LLP

(57) ABSTRACT

A liquid crystal display device and a method for driving the same are provided. The liquid crystal display device includes a first liquid crystal layer selectively driven by a first electric field in a first direction; and a second liquid crystal layer selectively driven a second electric field in a second direction, the second direction being different from the first direction.

14 Claims, 16 Drawing Sheets

WIDE VIEW ANGLE MODE

NARROW VIEW ANGLE MODE

LIQUID CRYSTAL DISPLAY DEVICE WITH CONTROLLED VIEWING ANGLE PANEL AND DRIVING METHOD THEREOF

This application is a divisional of parent application Ser. No. 11/453,935 filed Jun. 16, 2006 now U.S. Pat. No. 7,948,582 which application claims priority under 35 U.S.C. §119(a) on Patent Application No. 10-2005-0096593 filed in Korea on Oct. 13, 2005, the entire contents of each application being hereby incorporated by reference.

BACKGROUND OF THE INVENTION

1. Field of the Invention

The present invention relates to a liquid crystal display device and driving method thereof. Particularly the present invention relates to a liquid crystal display device in which a Wide Viewing Angle mode and a Narrow Viewing Angle mode can be easily selected by a user, and a driving method thereof.

2. Description of the Related Art

In general, a liquid crystal display device displays image by controlling optical transmittance of liquid crystal materials. This is done by injecting liquid crystal materials between two substrates (one has common electrode and the other has pixel electrode) and applying an electric field to the liquid crystal through electrodes facing each other with the liquid crystal therebetween.

A liquid crystal display device according to the direction of the electric field applied to the liquid crystal layer, can be categorized into a vertical electric field type and a horizontal electric field type.

The vertical electric field type LCD device drives the liquid crystal layer between a pixel electrode and a common electrode through a vertical electric field (vertical to an LCD panel surface). The common electrode of the upper substrate and the pixel electrode of the lower substrate are all transparent electrodes. Thus, high aperture ratio can be easily provided However, a disadvantage of this type LCD device is that a viewing angle range is narrowed to about 90°. This results from the movement of the liquid crystal which affects the light passing through the substrate in an oblique direction as the liquid crystal moves in the vertical direction to the substrate due to vertical electric field.

The horizontal electric field type LCD device is so-called In-Plane-Switching mode (IPS) LCD device. The IPS LCD device is driven by a horizontal electric field (horizontal direction to an LCD panel surface) between the pixel electrode and the common electrode arrayed on the lower substrate. In this mode, there is hardly a movement in the vertical direction as the liquid crystal is driven in the horizontal direction mainly. Therefore, the device has an advantage of having a wide viewing angle range of about 160°. Therefore, there is little effect on the light which passes through the substrate in an oblique direction.

FIGS. 1A and 1B illustrate a simplified related art IPS mode liquid crystal display device. In particular, it illustrates that the common electrode and the pixel electrode are arrayed in the pixel area. FIGS. 1A and 1B show that the IPS mode liquid crystal display device has the common electrode, the pixel electrode, upper and lower part substrates and polarizers.

According to FIGS. 1A and 1B, the IPS mode liquid crystal display device comprises a thin film transistor substrate (lower substrate) and a color filter substrate (upper substrate) which faces each other with a liquid crystal layer 10 therebetween and a spacer which maintains a cell gap between the two substrates.

The thin film transistor substrate comprises a gate line and a data line defining a pixel unit on a lower substrate 1, a thin film transistor formed at the crossing point of the gate line and the data line, a common electrode 5 and a pixel electrode 7 forming a horizontal electric field, and an alignment layer deposited on the common electrode and a pixel electrode for the initial alignment of the liquid crystal.

The color filter substrate comprises a color filter to present colors on the upper substrate 11, a black matrix to prevent light leakage between the neighboring color filters and the alignment layer deposited on the color filter and the black matrix for the initial alignment of the liquid crystal.

A lower polarizer 3 and an upper polarizer 13 polarizing incident light from a back light unit are adhered on the outside of the upper and lower substrates 1, 11. As shown in FIG. 1, the transmitting axes (polarizing axis of the polarizer) of the lower polarizer 3 and the upper polarizer 13 are perpendicular to each other. The linearly polarized light polarized by the lower polarizer 3 is transmitted into the liquid crystal materials. If the power is off, then the liquid crystal maintains its initial state. Therefore, the phase change due to the liquid crystal does not occur, and the polarizing direction does not change and transmits is the light. The direction of the linearly polarized light is perpendicular to the polarization axis of the upper polarizer 13. Therefore the linearly polarized light cannot pass through the upper polarizer 13. In other words, it shows the NB condition (Normally Black: dark screen appears when the power is off).

When an electric field is applied between the upper and lower substrates 1, 11, a liquid crystal 10 changes its alignment state according to the supplied signal. The operation of dark and bright display modes of the liquid crystal at the IPS mode would be described in detail hereinafter.

The display of dark screen is described with reference to FIG. 1A. The light polarized through the lower polarization substrate 3 enters into liquid crystal molecules 10A. The liquid crystal molecules are arrayed in parallel in an initial alignment direction as the electric field is not formed. A long axis of the liquid crystal molecules 10A is parallel to the transmitting axis of the polarizer 3. In addition, the long axis is initially aligned by the alignment layer to be in 90° as shown in the FIG. 1A. As a result, the polarization status does not change as the phase delay does not happen even if the polarized light enters into the liquid crystal molecules 10A. The light which enters into the liquid crystal molecules 10A is blocked because it cannot pass through the upper polarizer 13 having a transmitting axis perpendicular to the polarization direction of the lower polarizer 3. Therefore the liquid crystal display device shows a dark screen.

The display of a bright screen is described with reference to FIG. 1B. An electric field is formed between the electrodes 5, 7 and the liquid crystal molecules are rotated by the electric field. As a result, the liquid molecule is twisted. In general the twisted liquid molecules 10B are twisted to be in an angle of 45° to the transmitting axis of the lower polarizer 3 on average. The light polarized through the lower polarizer 3 has a phase delay as it passes through the twisted liquid crystal molecules 10B. The phase of the light polarized by the lower polarizer 3 is delayed by $\lambda/2$ along with the twisted liquid crystal 10B. Therefore, the light axis of the light incident from the lower polarizer 3 changes to 90°. The light axis of the light which has passed through the twisted liquid crystal molecules 10B is parallel to the transmitting axis of the upper polarizer 13 and therefore passes through the upper polarizer 13. Accordingly, the liquid crystal display device shows a bright screen.

The IPS mode liquid crystal display device has a wide viewing angle compared to the vertical electric field mode liquid crystal display device. The device having a wide viewing angle has an advantage in that the viewer can see images within a wide viewing angle range. However, in some cases such as using computers for personal purpose or conducting a security-required work at banks or insurance companies, a narrow viewing angle LCD device is preferred.

SUMMARY OF THE INVENTION

The purpose of the present invention is to provide a liquid crystal display device which can switch from the wide viewing angle mode to the narrow viewing angle mode easily according to the work environment of the users.

In order to achieve the above mentioned purpose, a liquid crystal display device, as embodied, a first electrode group to selectively apply a horizontal electric field; a first panel including a first liquid crystal layer driven by the horizontal electric field; a second electrode group below or above the first panel to selectively apply a vertical electric field, and a second panel including a second liquid crystal layer driven by the vertical electric field.

In another aspect of the present invention, as embodied, a method for driving a liquid crystal display device, the method comprising: displaying a video image on a first panel by selectively applying a horizontal electric field to a first liquid crystal layer of the first panel of the liquid crystal display device; and selectively applying a vertical electric field to a second liquid crystal layer of the second panel of the liquid crystal display device.

In another aspect of the present invention, as embodied, a liquid crystal display device comprising: a first liquid crystal layer selectively driven by a first electric field in a first direction; and a second liquid crystal layer selectively driven a second electric field in a second direction, the second direction being different from the first direction.

In another aspect of the present invention, as embodied, a method for driving a liquid crystal display device, the method comprising: selectively applying a first electric field in a first direction on a first liquid crystal layer of the liquid crystal display device; selectively applying a second electric field in a second direction on a second liquid crystal layer of the liquid crystal display device, the second direction being different from the first direction.

DETAILED DESCRIPTION OF THE ILLUSTRATED EMBODIMENTS

The purposes and advantages of the present invention will be described through the preferred embodiment of the present invention with reference to the attached drawings. The preferred embodiment of the present invention will be described referring to FIG. 2 through 10A.

Figure 1A:
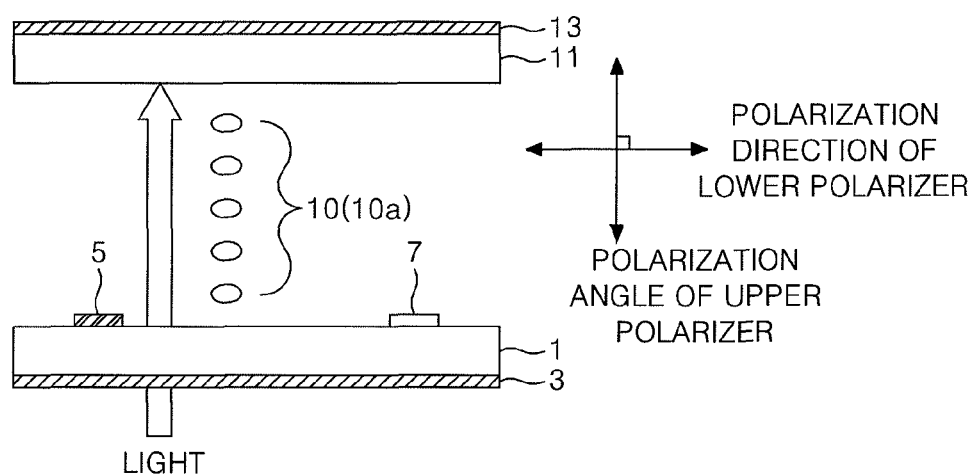
FIGS. 1A and 1B illustrate the operation of the related art for In Plane Switching mode liquid crystal display panel.
Figure 1B:
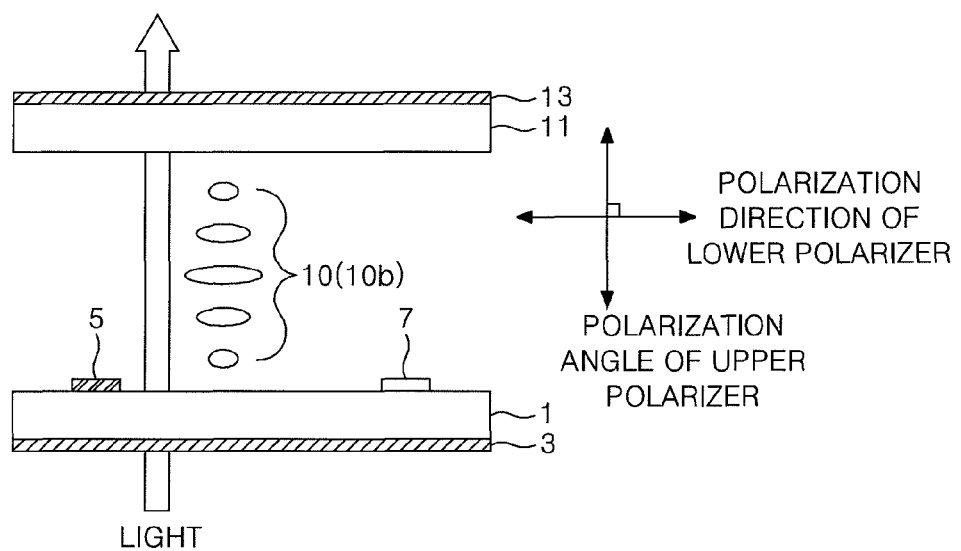
Figure 2:
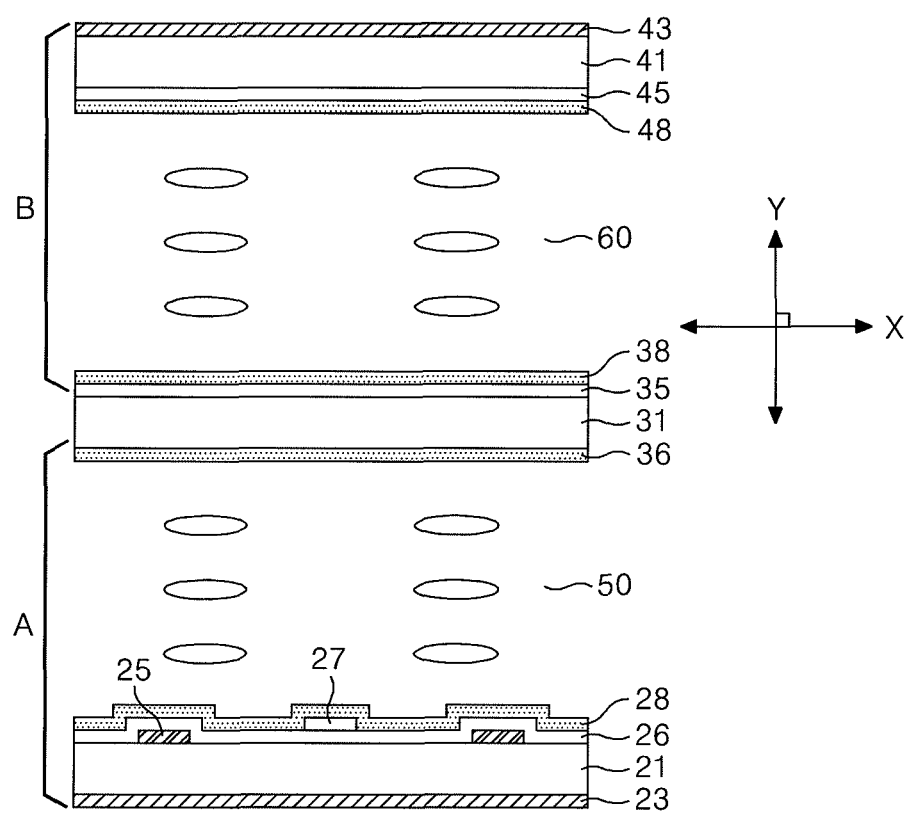
FIG. 2 illustrates the structure of a liquid crystal display device according to an embodiment of the present invention.

FIG. 2 illustrates a simplified structure of the liquid crystal display device according to an embodiment of the present invention. In particular, FIG. 2 shows a common electrode and pixel electrode arrayed in parallel on one pixel area.

Referring to FIG. 2, the illustrated liquid crystal device comprises a first panel part (A) which operates in an In Plane Switching mode to provide a wide viewing angle mode by driving the liquid crystal with a horizontal electric field, and a second panel part (B) which operates in an Electrically Controlled Birefringence (ECB) mode to change the viewing angle range by driving the liquid crystal with a vertical electric field.

The first panel part (A) which is driven in the IPS mode includes a first substrate 21 and a second substrate 31, a spacer to maintain cell gap between the first and second substrates 21, 31 and a first liquid crystal layer 50 filling the cell gap.

A gate line and a data line defining a pixel unit, a thin film transistor which is formed on the crossing area of the gate and data line, a common electrode 25 and a pixel electrode 27 which are parallel, and a first alignment layer 28 coated on the common and pixel electrode for initial alignment of the first liquid crystal layer 50 are formed on the upper part of the first substrate 21. A lower polarizer 23 is formed at the lower part of the first substrate 21. A second alignment layer 36 is formed at the lower part of the second substrate 31 for initial alignment of the first liquid crystal layer 50.

The first and second alignment layers 28, 36 define the initial alignment direction of the first liquid crystal layer 50. The first liquid crystal layer 50 is aligned such that the long axis direction of the first liquid crystal is parallel to the first and second alignment layers 28, 36.

The common electrode 25 and the pixel electrode 27 which are arrayed in parallel to form a horizontal electric field when a voltage is supplied to drive the first liquid crystal layer 50. The first liquid crystal layer 50 driven by the horizontal electric field provides a wide viewing angle range.

The lower polarizer 23 selectively transmits the component of the incident light from the back light unit, which is parallel to the polarization direction of the lower polarizer 23.

The second panel part (B) driven by ECB mode includes a second substrate 31 and a third substrate 41, a spacer maintaining the cell gap between the two substrates and a second liquid crystal layer 60 filling the cell gap.

A first electrode 35 which corresponds to the lower electrode and a third alignment layer 38 coated on the first electrode to align the second liquid crystal layer 60 are formed on the upper part of the second substrate 31. A second electrode 45 which corresponds to the upper part electrode and a forth alignment layer 48 coated under the second electrode to align the second liquid crystal layer 60 are formed on the lower part of the third substrate 41. An upper part polarizer 43 is formed on the upper part of the third substrate 41.

A color filter for presenting the colors and a black matrix for preventing light leakage can be formed between the lower part of the third substrate 41 and the second electrode 45.

The third and the forth alignment layers 38, 48 set up the initial alignment direction of the second liquid crystal layer 60. The alignment direction of the third and forth alignment layers 38, 48 is identical to the alignment direction of the first and second alignment layers wherein the second liquid crystal layer 60 is aligned to have an identical direction of the alignment direction of the first liquid crystal layer 50.

The first electrode 35 and the second electrode 45 formed at the upper/lower part of the second panel part (B) generate a vertical electric field when a power is applied and drive the second liquid crystal layer 60. The liquid crystal layer 60 driven at the vertical electric field can switch between the narrow viewing angle mode and the wide viewing angle mode.

The upper polarizer 43 selectively transmits the light from the first panel part (A) having the direction parallel to the transmitting axis (Y) of the upper polarizer 43. The transmitting axis (Y) of the upper polarizer 43 is perpendicular to the transmitting axis (X) of the lower polarizer 23. The liquid crystal display device according to an embodiment of the present invention may have a middle polarizer on the upper or lower part of the second substrate 31. In case of having the middle polarizer, the transmitting axis of the middle polarizer and the transmitting axis of the lower polarizer 23 are perpendicular to each other. The transmitting axis (X) of the lower polarizer 23 and the transmitting axis of the upper polarizer 43 are parallel. The detailed description will be given referring to FIGS. 3-7.

As illustrated in FIG. 2, the liquid crystal display device according to an embodiment of the present invention is driven in the wide viewing angle mode and the narrow viewing angle mode using the first panel part (A) and the second panel part (B). The first panel part (A) has the characteristics of the wide viewing angle and the second panel part (B) is selectively driven by a vertical electric field to provide the wide viewing angle mode and the narrow viewing angle mode according to the on-off of the vertical electric field.

The detailed description of the wide viewing angle mode and the narrow viewing angle mode will be given referring to FIGS. 3-8.

Figure 3A:
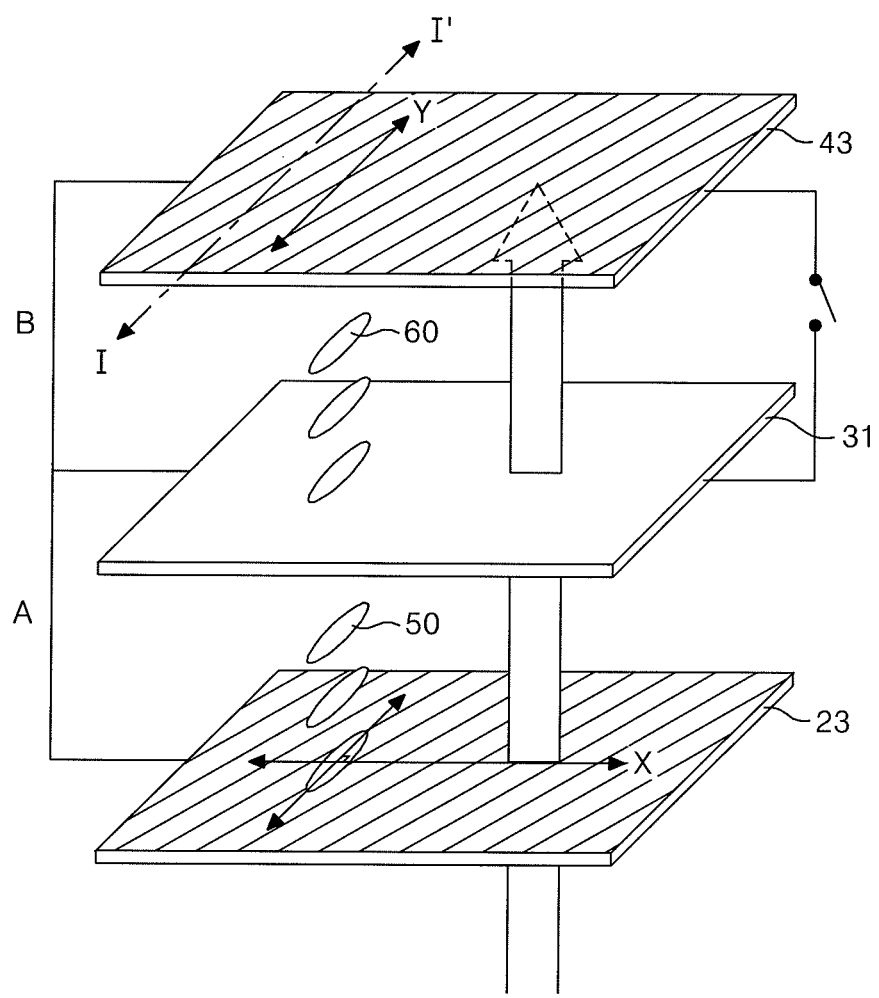
FIGS. 3A and 3B are perspective view and cross sectional view illustrating operation of wide viewing angle mode of the liquid crystal display device according to an embodiment of the present invention when displaying a dark image.
Figure 3B:
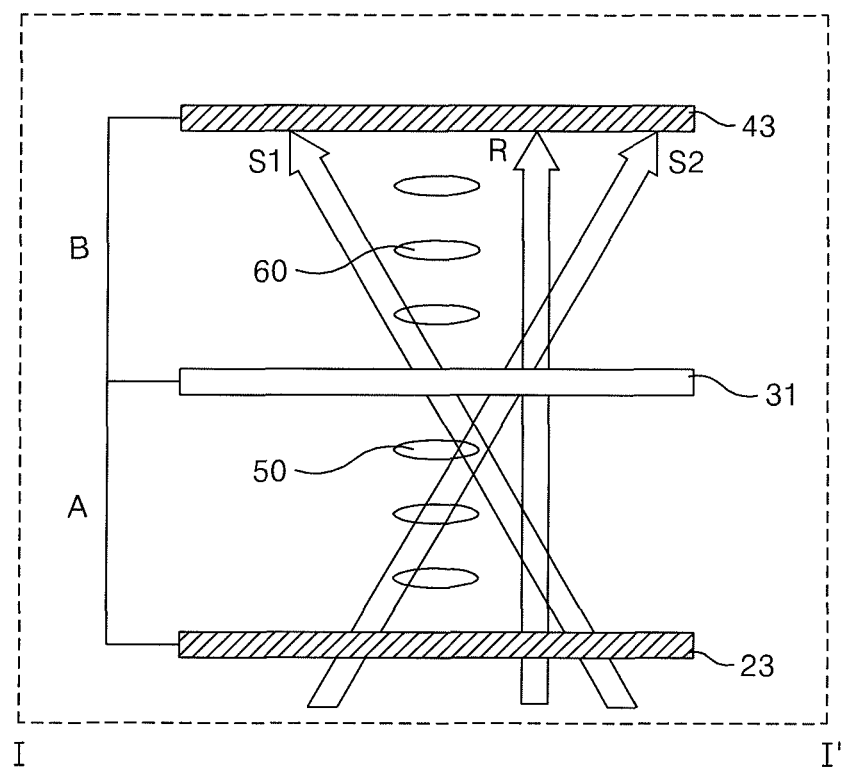

FIGS. 3A and 3B are a perspective view and a cross sectional view of the liquid crystal display device according to an embodiment of the present invention to illustrate the operation of the wide viewing angle mode when the screen shows dark image.

Referring to the FIGS. 3A and 3B, the first panel part (A) driven in IPS mode maintains the initial alignment direction so that the long axis direction of the first liquid crystal layer 50 is substantially perpendicular (or parallel) to the transmitting axis (X) of the lower polarizer 23. The LCD can operate in an NB (normally Black) condition by arranging the transmitting axis (X) of the lower polarizer 23 perpendicular to the transmitting axis (Y) of the upper polarizer 43.

The incident light from the back light unit is linearly polarized to be parallel to the transmitting axis (x) of the lower polarizer 23, if the horizontal electric field is not applied to the first panel part A. This polarized light passes through the first liquid crystal layer 50. However, the long axis direction of the first liquid crystal layer 50 is 90° (or parallel) and therefore there is no phase delay. The polarized light maintains the polarization condition of the lower polarizer 23. Subsequently, the light passes through the transparent second substrate 31. The light which passes through the second substrate 31 then passes the second liquid crystal layer 60. As there is no electric field at the second panel part (B), the second liquid crystal layer 60 maintains the initially alignment direction. Therefore, the light which passes the second liquid crystal layer 60 does not have the phase delay and maintains the polarization condition of the lower polarizer 23. The light maintaining the polarization condition of the lower polarizer 23 is blocked by the upper polarizer 43 it is perpendicular to the transmitting axis (Y) of the upper polarizer 43. As a result, the liquid crystal display device shows a dark image. As illustrated in FIG. 3B, the light is blocked regardless of the viewing directions (front direction: R, oblique direction: S1, S2). Therefore a black color is shown evenly throughout the wide viewing angle range.

As another embodiment of the present invention, a middle polarizer can be further included in the upper or lower part of the second substrate 31. In case of having the middle polarizer, the transmitting axis of the lower polarizer 23 and the transmitting axis of the middle polarizer are perpendicular to each other and the transmitting axis of the lower polarizer 23 and the transmitting axis of the upper polarizer 43 are parallel to each other. Furthermore, only the component of the light incident from the back light unit parallel to the transmitting axis of the lower polarizer 23 can pass through the lower polarizer 23. The light which transmitted the lower polarizer 23 also passes through the first liquid crystal layer 50 which has no phase delay. Therefore, the light maintains the polarization condition of the lower polarizer 23. The light which passes through the first liquid crystal layer 50 and thus maintains the polarization condition of the lower polarizer 23 cannot pass through the middle polarizer which is formed vertical to the transmitting axis of the lower polarizer 23. Finally, a dark image is displayed out of the upper polarizer 43. The final display result of the liquid display device is identical to FIGS. 3A and 3B even if the middle polarizer is added.

Figure 4A:
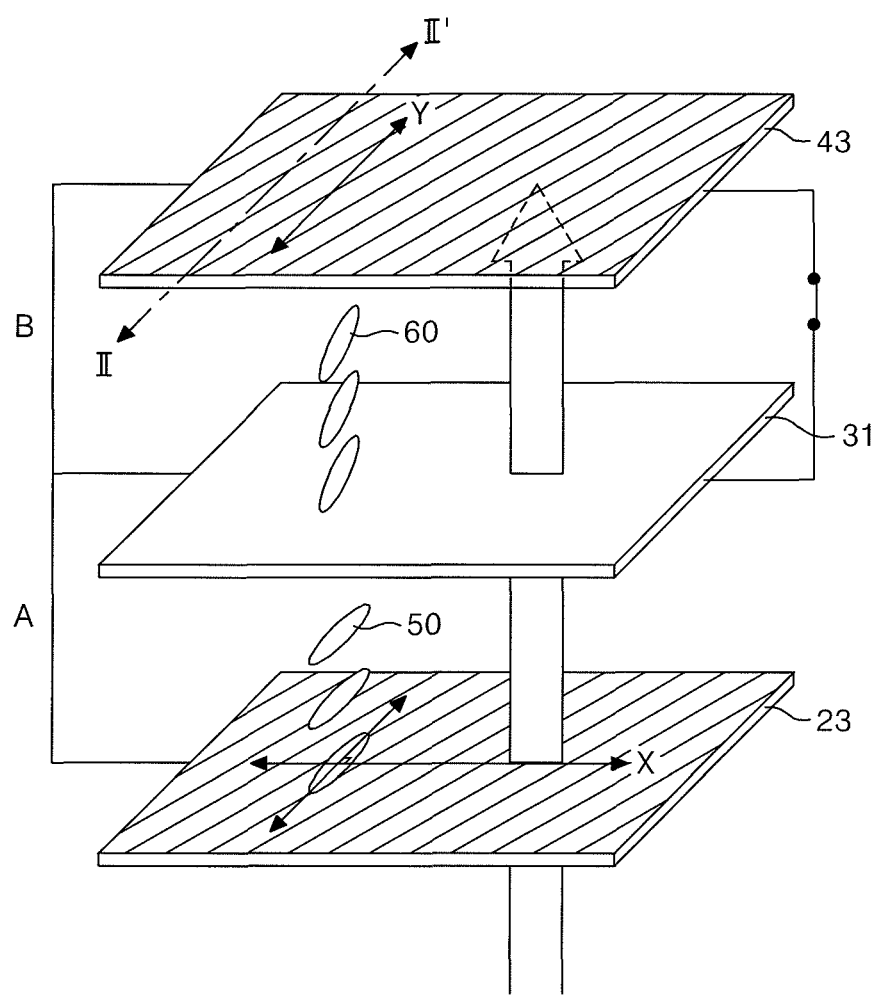
FIGS. 4A and 4B are perspective view and cross sectional view illustrating operation of narrow viewing angle mode of the liquid crystal display device according to an embodiment of the present invention when displaying a dark image.
Figure 4B:
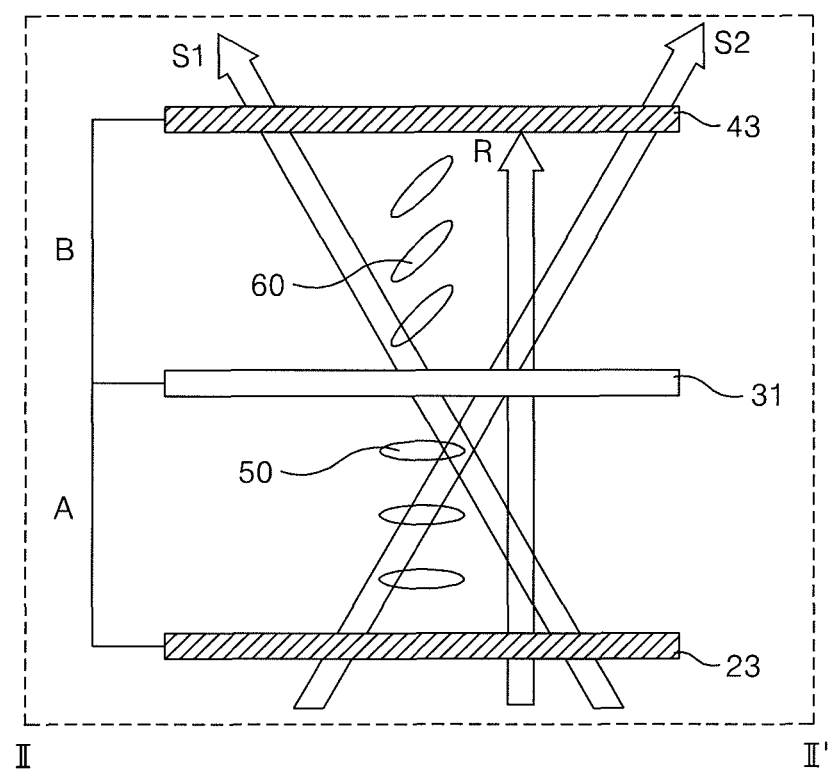

FIGS. 4A and 4B are a perspective view and a cross sectional view of the liquid crystal display device according to an embodiment of the present invention to illustrate the operation of the narrow viewing angle mode when the screen shows a dark image. Referring to the FIGS. 4A and 4B, the first panel part (A) driven in IPS mode maintains the initial alignment direction so that the long axis direction of the first liquid crystal layer 50 is substantially perpendicular (or parallel) to the transmitting axis (X) of the lower polarizer 23.

The LCD can operate in an NB (normally Black) condition by arranging the transmitting axis (X) perpendicular to the transmitting axis of the upper polarizer (Y). The incident light from the back light unit is linearly polarized to be parallel to the transmitting axis (x) of the lower polarizer 23 if the horizontal electric field is not applied to the first panel part (A). This polarized light passes through the first liquid crystal layer 50. At that time, the long axis direction of the first liquid crystal layer 50 is 90° (or parallel) and therefore there is no phase delay. The polarized light maintains the polarization condition of the lower polarizer 23. After that, the light passes through the transparent second substrate 31. The light which passes through the second substrate 31 also passes through the second panel part (B) in which the vertical field is applied.

In particular, the liquid crystal molecules of the second liquid crystal layer 60 is rotated to have a certain oblique angle against the plane of the second substrate 31 as the vertical electric field is applied to the second liquid crystal layer 60. Accordingly, the light which passes through the first liquid crystal layer 50 and the second substrate 31 and maintains the polarization condition of the lower polarizer 23 passes through the second liquid crystal layer 60. The condition of the light which passes through the second liquid crystal layer 60 will be described referring to the FIG. 4B.

Referring to the FIG. 4B, the light which passes through the second liquid crystal layer 60 has a phase difference according to the transmitting direction of the light. The light transmitted in the front direction (R) does not have the phase delay even if the light is transmitted in the twisted second liquid crystal layer 60 as shown in FIGS. 3A and 3B. This is because the twisted condition of the liquid crystal layer does not affect the light in the front direction (R). As a result, the light maintains the polarization condition of the lower polarizer 23. The light transmitted in the front direction (R) does not have the same polarizing direction with the transmitting axis (Y) of the upper polarizer 43. Therefore, it is blocked by the upper polarizer 43 and the liquid crystal display device displays a dark image. However, when the light is transmitted in the oblique directions (S1, S2), the phase delay occurs due to the twisted condition of the second liquid crystal layer 60. As a result, the polarized condition of the light changes due to the phase delay to have the component parallel to the transmitting axis (Y) of the upper polarizer 43 (e.g., the light transmitted in oblique directions S1 and S2), which causes light leakage. If the electric field is not formed at the first panel part (A) but is formed at the second panel part (B), the light leaks at the oblique directions (S1, S2). Since the light leakage may be undesirable, when display a dark image, the vertical electric field can be disabled so that it will not be applied to the second panel part (B) to prevent the light leakage.

A middle polarizer can also be further included at the upper or lower part of the second substrate 31 as mentioned in the previous embodiment. In case of having the middle polarizer, the transmitting axis of the lower polarizer 23 and the transmitting axis of the middle polarizer are perpendicular to each other, while the transmitting axis of the lower polarizer 23 and the transmitting axis of the upper polarizer 43 are parallel. Furthermore, only the component of the light incident from the back light unit which is parallel to the transmitting axis of the lower polarizer 23 will pass through the lower polarizer 23. The light which passes through the lower polarizer 23 also passes the first liquid crystal layer 50 without phase delay. Therefore, the light maintains the polarization condition of the lower polarizer 23. The light which passes the first liquid crystal layer 50 and thus maintains the polarization condition of the lower polarizer 23 cannot pass through the middle polarizer which is perpendicular to the transmitting axis of the lower polarizer 23. Finally, a dark image is displayed out of the upper polarizer 43. The final display result of the liquid display device is identical to FIGS. 4A and 4B even if the middle polarizer is added.

Figure 5:
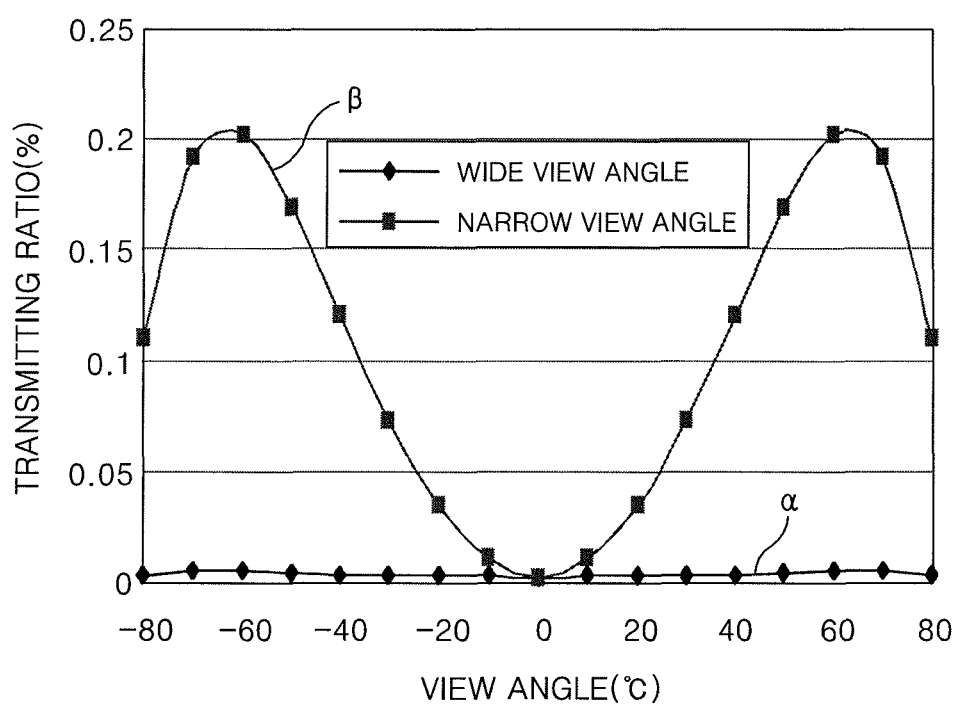
FIG. 5 is a graph indicating a transmission factor with respect to the viewing angle when displaying a dark image on the liquid crystal display device.

FIG. 5 shows the transmitting ratio of the liquid crystal display device with respect to the viewing angle when displaying a dark image illustrated in FIG. 3A to 4B. As shown in FIG. 5, the second panel part (B) which is ECB mode has a transmitting ratio illustrated as the α-curve when the vertical electric field is off (wide viewing angle mode) and has a transmitting ratio illustrated as the β-curve when the vertical electric field is on (narrow viewing angle mode).

The α-curve shows that a normal dark image can be displayed on a wide viewing angle range as the light is blocked regardless of the transmitting direction when the vertical electric field applied to the second panel part (B) is off (wide viewing angle mode). The β-curve shows that the light passes through the upper polarizer and leaks. The reason for the leakage is because the light which passes in the oblique directions changes in its polarization characteristic due to the twisted second liquid crystal layer 60, when the vertical electric field applied to the second panel part (B) is on (narrow viewing angle mode). The normal dark image can only be displayed between the viewing angle of +20°~−20° (viewing angle below 40°) as the transmitting ratio is below 0.05%.

Figure 6A:
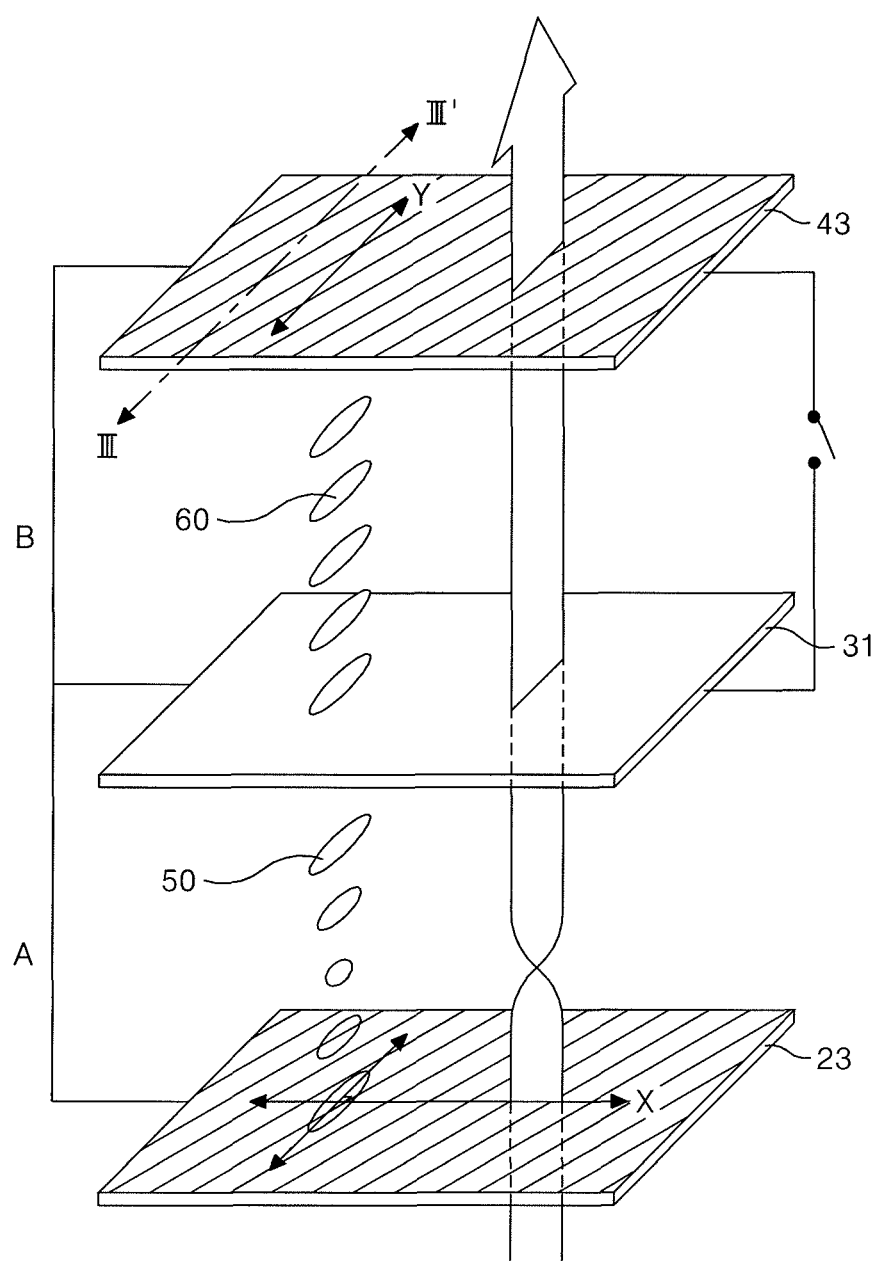
FIGS. 6A and 6B are perspective view and cross sectional view illustrating the operation of a wide viewing angle mode of the liquid crystal display device according to an embodiment of the present invention when displaying a bright image.
Figure 6B:
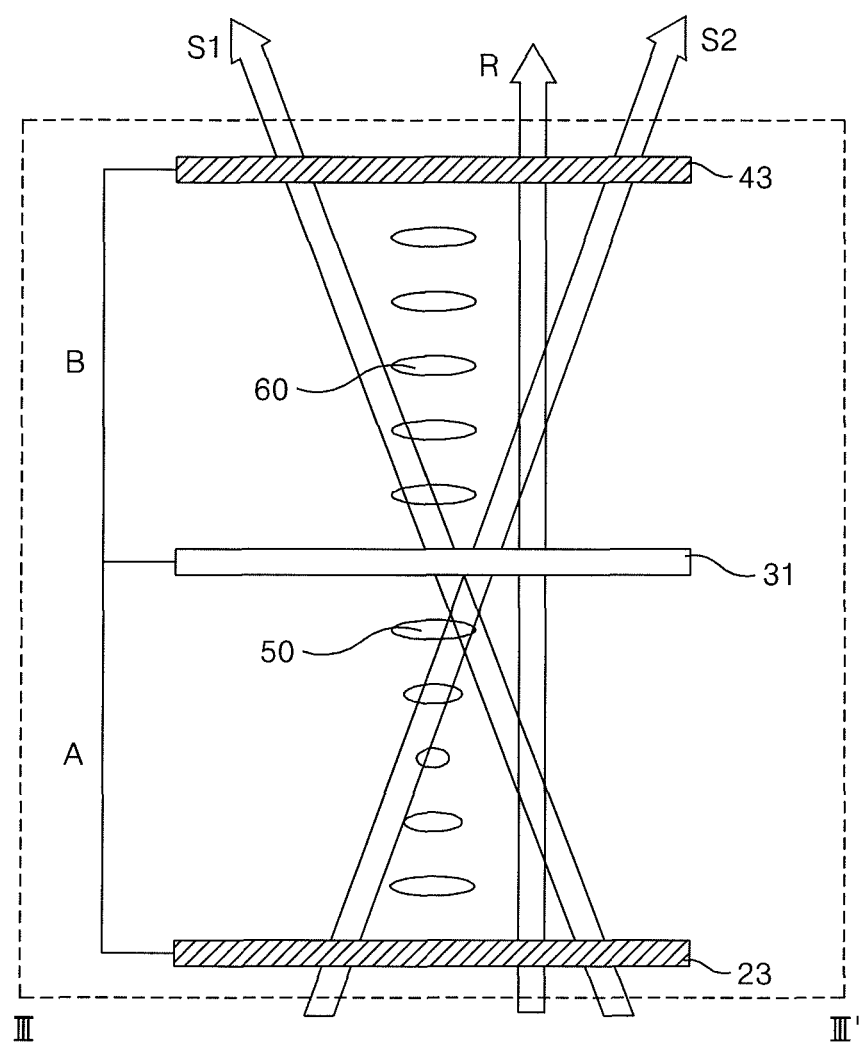

FIGS. 6A and 6B are a perspective view and a cross sectional view of the liquid crystal display device according to an embodiment of the present invention to illustrate the operation of the wide viewing angle mode when the screen shows a bright image. Referring to FIGS. 6A and 6B, the first panel part (A) which is driven in IPS mode applies a horizontal electric field to the first liquid crystal layer 50 when displaying a bright image. When the horizontal electric field is applied to the first panel part (A), the first liquid crystal layer 50 rotates due to the horizontal electric field between a common electrode and a pixel electrode. Therefore, the first liquid crystal layer 50 is twisted. The twist angle of the liquid crystal cell 50 is 45° on average to the polarization direction of the lower polarizer 23.

The component of the light incident from the back light unit parallel to the transmitting axis (X) of the lower polarizer 23 passes through the lower polarizer 23 and the first liquid crystal layer 50 when the horizontal electric field is applied to the first panel part (A). The light passes the first liquid crystal layer 50 which is 45° on average to the transmitting axis (X) of the lower polarizer 23 and the phase of polarization of the light is delayed by λ/2. Thus the polarization of the light (polarization to X axis direction) is changed to 90°. The polarized light then passes through the transparent second substrate 31. The light which passes the second substrate 31 maintains the changed polarization direction as there is no electric field applied at the second panel part (B). In other words, the light passing through the second liquid crystal layer 60 does not have the phase delay and maintains the polarization condition which has changed in 90° from the polarization condition after passing through the lower polarizer 23. The light maintaining the above mentioned condition passes through the upper polarizer 43 as the light polarized direction and the transmitting axis (Y) of the upper polarizer 43 are parallel. Therefore, the liquid crystal display device displays a bright image. As shown in FIG. 6B, the light passes regardless of the transmitting direction (front direction: R, oblique directions: S1, S2) so that a bright image is displayed in the wide viewing angle mode.

A middle polarizer can also be further included at the upper or lower part of the second substrate 31 as mentioned in the previous embodiments. In case of having the middle polarizer, the transmitting axis of the lower polarizer 23 and the transmitting axis of the second polarizer are perpendicular to each other while the transmitting axis of the lower polarizer 23 and the transmitting axis of the upper polarizer 43 are parallel. Furthermore, only the component of the light incident from the back light unit which is parallel to the transmitting axis of the lower polarizer 23 will pass through the lower polarizer 23. The light passes through the first liquid crystal layer 50 which is 45° on average to the transmitting axis (X) of the lower polarizer 23 and its phase is delayed by $\lambda/2$. Therefore, the polarization of the light (polarization to X axis direction) is changed to 90°. The light changed to 90° at the initial incident polarization direction passes through the transparent second substrate 31. The light which passes through the second substrate 31 maintains the changed polarization direction as there is no electric field applied at the second panel part (B). In other words, the light passing through the second liquid crystal layer 60 does not have the phase delay and maintains the polarization condition which has changed in 90° from the polarization condition after passing the lower polarizer 23. The light maintaining the above mentioned condition passes through the upper polarizer 43 as the light axis and the transmitting axis (Y) of the upper polarizer 43 are parallel. Therefore, the liquid crystal display device displays a bright image. The final display result of the liquid display device is identical to FIGS. 6A and 6B even if the middle polarizer is added.

Figure 7A:
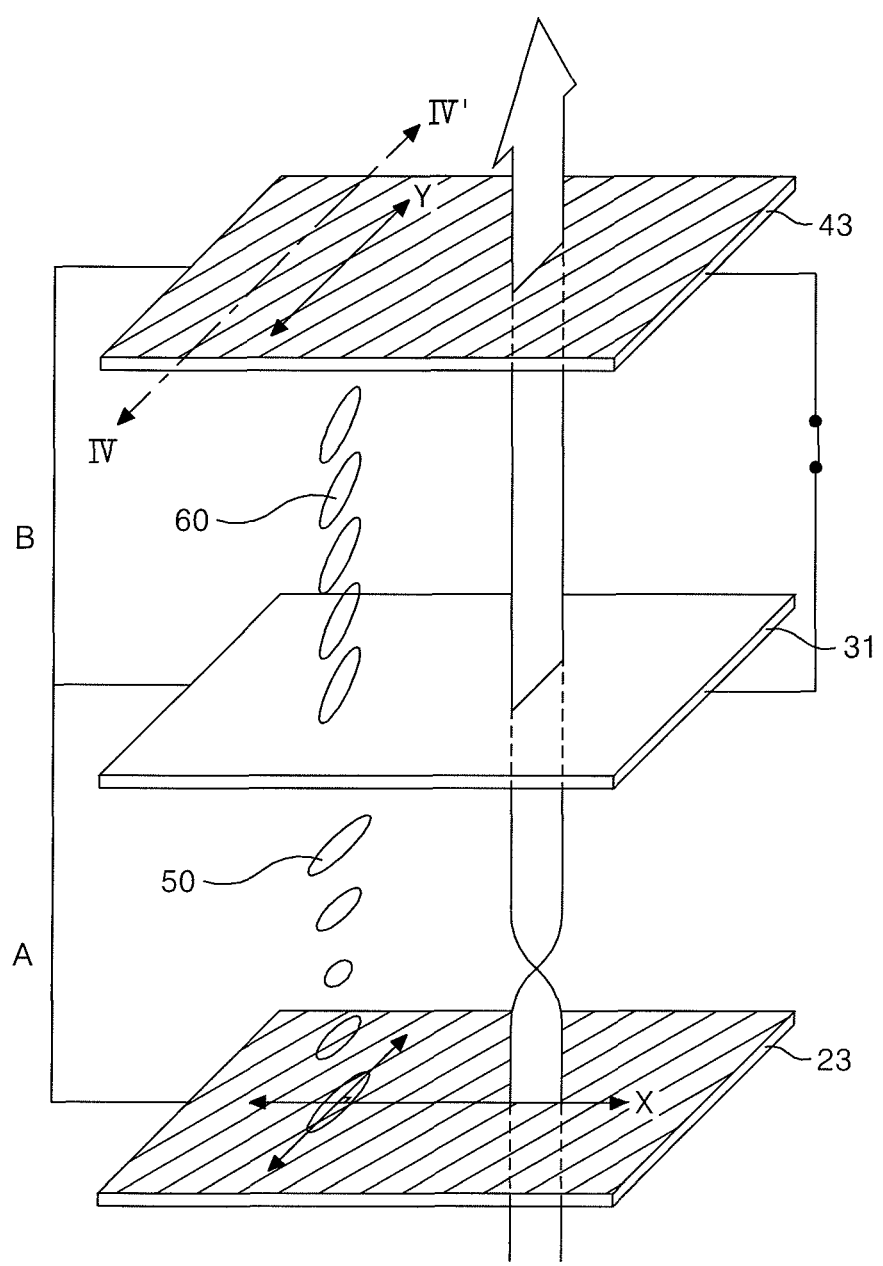
FIGS. 7A and 7B are perspective view and cross sectional view illustrating operation of narrow viewing angle mode of the liquid crystal display device according to an embodiment of the present invention when displaying a bright image.
Figure 7B:
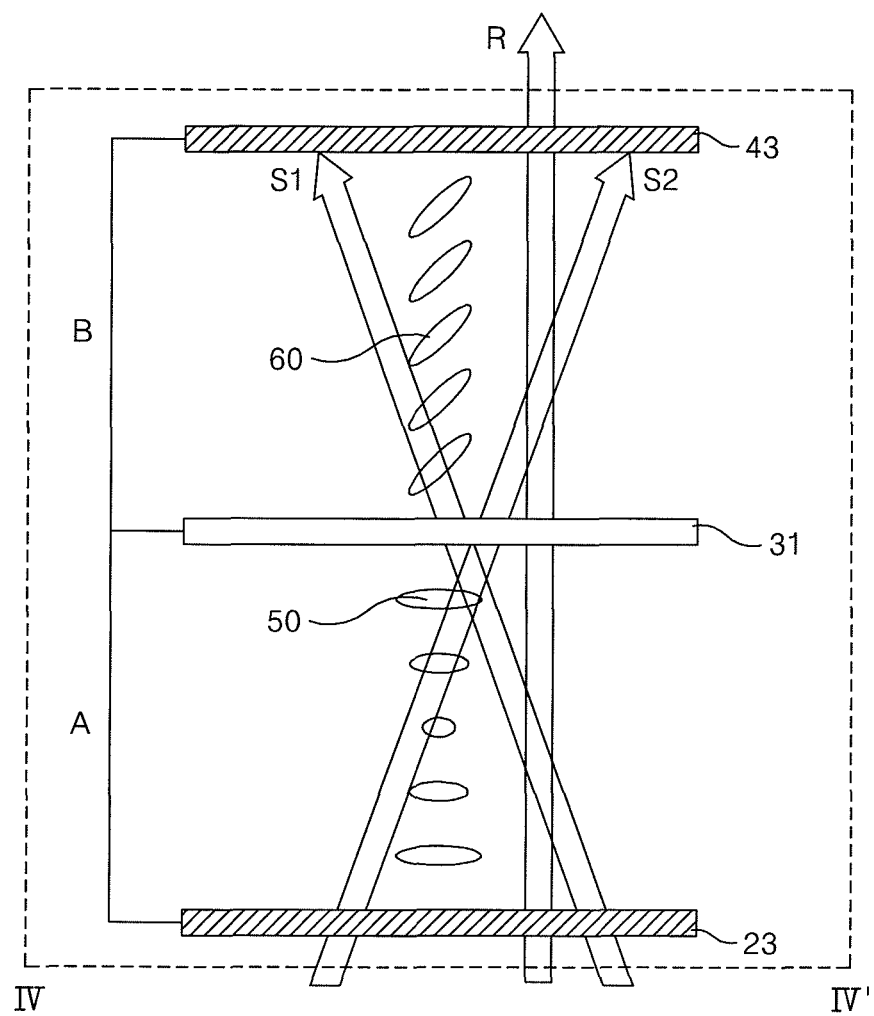

FIGS. 7A and 7B are a perspective view and a cross sectional view of the liquid crystal display device according to an embodiment of the present invention to illustrate the operation of the narrow viewing angle mode when the screen shows a bright image. Referring to FIGS. 7A and 7B, the first panel part (A) which is driven in IPS mode applies the horizontal electric field to the first liquid crystal layer 50 when displaying a bright image. When the horizontal electric field is applied to the first panel part (A), the first liquid crystal layer 50 rotates due to the horizontal electric field between a common electrode and a pixel electrode. Therefore, the first liquid crystal layer 50 is twisted. The twist angle of the liquid crystal cell 50 is 45° on average to the polarization direction of the lower polarizer 23.

The component of the light incident from the back light unit parallel to the transmitting axis (X) of the lower polarizer 23 passes through the lower polarizer 23 and the first liquid crystal layer 50 when the horizontal electric field is applied to the first panel part (A). The light transmits the first liquid crystal layer 50 which is 45° on average to the transmitting axis (X) of the lower polarizer 23 and its phase is delayed by $\lambda/2$. Therefore, the polarization of the light (polarization to X axis direction) is changed to 90°. The light changed to 90° from the initial incident polarization direction passes through the transparent second substrate 31. The light which passes through the second substrate 31 then passes through the second panel part (B) applied by a vertical electric field so it can operates in the narrow viewing angle mode.

In particular. the second liquid crystal layer 60 is rotated to have a certain oblique angle against the second substrate 31 as the vertical electric field is applied to the second liquid crystal layer 60. The light which passes through the first liquid crystal layer 50 and the second substrate 31 and which maintains the polarization condition of the lower polarizer 23 passes the second liquid crystal layer 60. The condition of the light which passes the second liquid crystal layer 60 will be described referring to the FIG. 7B.

Referring to the FIG. 7B, the light which passes the second liquid crystal layer 60 has a phase difference according to the transmitting direction of the light. The light transmitted in the front direction (R) does not have the phase delay even if the light passes the twisted second liquid crystal layer 60. This is because the twisted condition of the liquid crystal layer does not affect the light transmitted in the front direction (R). As a result, the light maintains the polarization condition by the lower polarizer 23. The light transmitted in the front direction (R) has the same direction with the transmitting axis (Y) of the upper polarizer 43 so it passes through the upper polarizer 43. Therefore, the liquid crystal display device displays a bright image. However, when the light is transmitted in oblique directions (S1, S2), the phase delay occurs due to the twisted condition of the second liquid crystal layer 60 by the vertical electric field. As a result, the polarized condition changes due to the phase delay. Therefore, the component of the light perpendicular to the transmitting axis (Y) of the upper polarizer 43 (e.g., the light transmitted in oblique directions S1 and S2) will be blocked by the upper polarizer 43. If the horizontal electric field is formed at the first panel part (A) and the vertical electric field formed at the second panel part (B), the light is blocked at the oblique directions (S1, S2). Thus the viewing angle showing the normal image is narrowed.

A middle polarizer can also be further included at the upper or lower part of the second substrate 31 as mentioned in the previous preferred embodiments. In case of having the middle polarizer, the transmitting axis of the lower polarizer 23 and the transmitting axis of the middle polarizer are perpendicular to each other while the transmitting axis of the lower polarizer 23 and the transmitting axis of the upper polarizer 43 are parallel. Furthermore, Only the component of the light incident from the back light unit parallel to the transmitting axis (X) of the lower polarizer 23 passes through the lower polarizer 23 and the first liquid crystal layer 50 when the horizontal electric field is applied to the first panel part (A). The light passes through the first liquid crystal layer 50 which is 45° on average to the transmitting axis (X) of the lower polarizer 23 and its phase is delayed by $\lambda/2$. Therefore, the polarization of the light (polarization to X axis direction) is changed to 90°. The light changed to 90° at the initial incident polarization direction passes through the transparent second substrate 31. The light which passes the first liquid crystal layer 50 also passes through the middle polarizer which is perpendicular to the transmitting axis of the lower polarizer 23. Then the light enters into the second liquid crystal layer 60 to which the vertical direction is applied. The light passes through the second liquid crystal layer 50 in the front direction (R) which is 45° to the transmitting axis (Y) of the middle polarizer and its phase is delayed by $\lambda/2$. Therefore, the polarization of the light transmitted in the front direction (R) is changed to 90° from the transmitting axis (Y) of the middle polarizer. The light transmitted in the front direction (R) has the same direction with the transmitting axis (Y) of the upper polarizer 43 so that it passes through the upper polarizer 43. Therefore, the liquid crystal display device displays a bright image. However, when the light is transmitted in oblique directions (S1, S2), the phase delay occurs due to the twisted condition of the second liquid crystal layer 60 by the vertical electric field. As a result, the polarized condition changes due to the phase delay. Therefore, the component of the light perpendicular to the transmitting axis of the upper polarizer 43 (e.g., the light transmitted in oblique directions S1 and S2) will be blocked by the upper polarizer 43. Therefore, the final display condition of the liquid display device is identical to FIGS. 7A and 7B even if the second polarization substrate is added.

Figure 8:
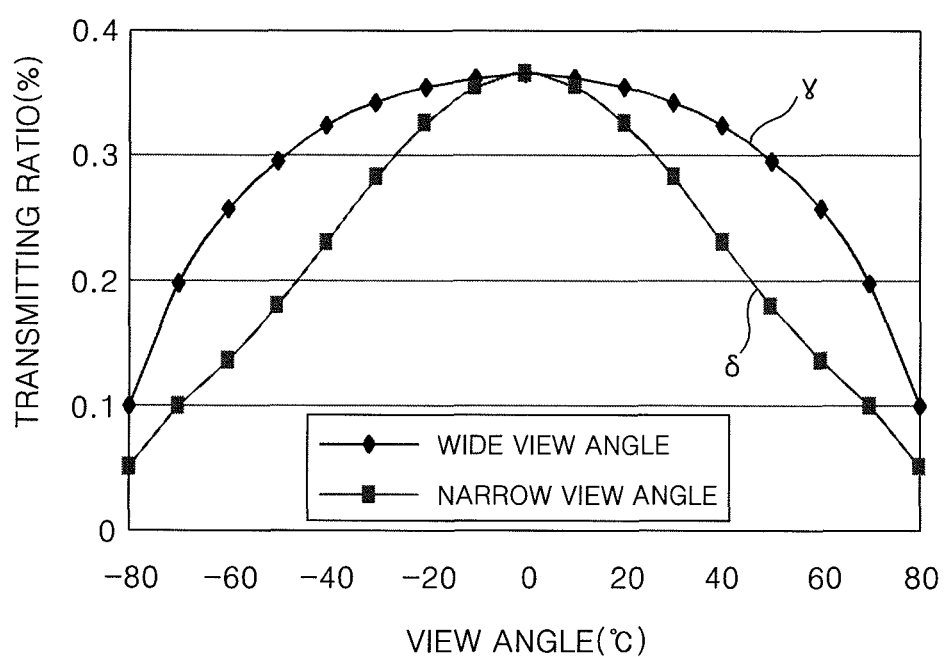
FIG. 8 is a graph indicating a transmission factor with respect to the viewing angle when displaying a bright image on the liquid crystal display device.

FIG. 8 shows a transmitting ratio of the liquid crystal display device with respect to the viewing angle when displaying a bright image illustrated in FIGS. 6-7. As show in FIG. 8, the second panel part (B) which is ECB mode has a transmitting ratio illustrated as the γ-curve when the vertical electric field is off (wide viewing angle mode) and has a transmitting ratio illustrated as the δ-curve when vertical electric field is on (narrow viewing angle mode).

Referring to the γ-curve, when the vertical electric field is off (wide viewing angle mode) when displaying a bright image, the light passes normally regardless of the viewing direction. The δ-curve illustrates that the light is blocked as it is phase delayed at the oblique directions against the second substrate due to the twisted second liquid crystal layer when the vertical electric field is off (narrow viewing angle) when displaying a bright image.

Figure 9:
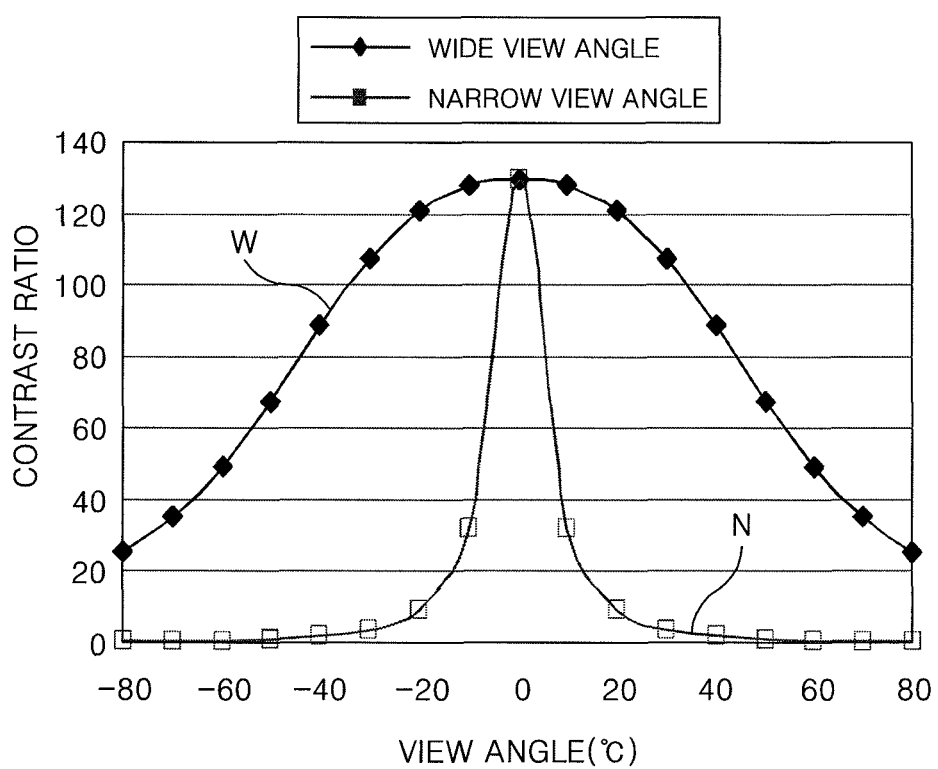
FIG. 9 is a graph indicating a contrast ratio with respect to the viewing angle at the wide and narrow viewing angle modes of the liquid crystal display device according to an embodiment of the present invention.

FIG. 9 shows the contrast ratio curve at the wide and narrow viewing angle modes. Referring to FIG. 9, the W-curve shows the contrast ratio of the wide viewing angle mode through the α-curve of FIG. 5 showing the wide viewing angle transmitting ratio when displaying a dark image and the γ-curve of FIG. 8 showing the wide viewing angle transmitting ratio when displaying a bright image. In addition, the N-curve shows the contrast ratio of the narrow viewing angle mode through the β-curve of FIG. 5 showing the narrow viewing angle transmitting ratio when displaying a dark image and the δ-curve of FIG. 8 showing the narrow viewing angle transmitting ratio when displaying a bright image is obtained. With reference to the W-curve, the contrast ratio at the wide viewing angle mode does not show a big decline at the right or left oblique direction. Therefore, the wide viewing angle mode is obtained. On the other hand, referring to the N-curve, the contrast ratio at the narrow viewing angle mode shows a big decline at the right and left oblique directions and a clear contrast ratio can only be seen in the front direction. Thus, the narrow viewing angle mode is obtained.

Figure 10A:
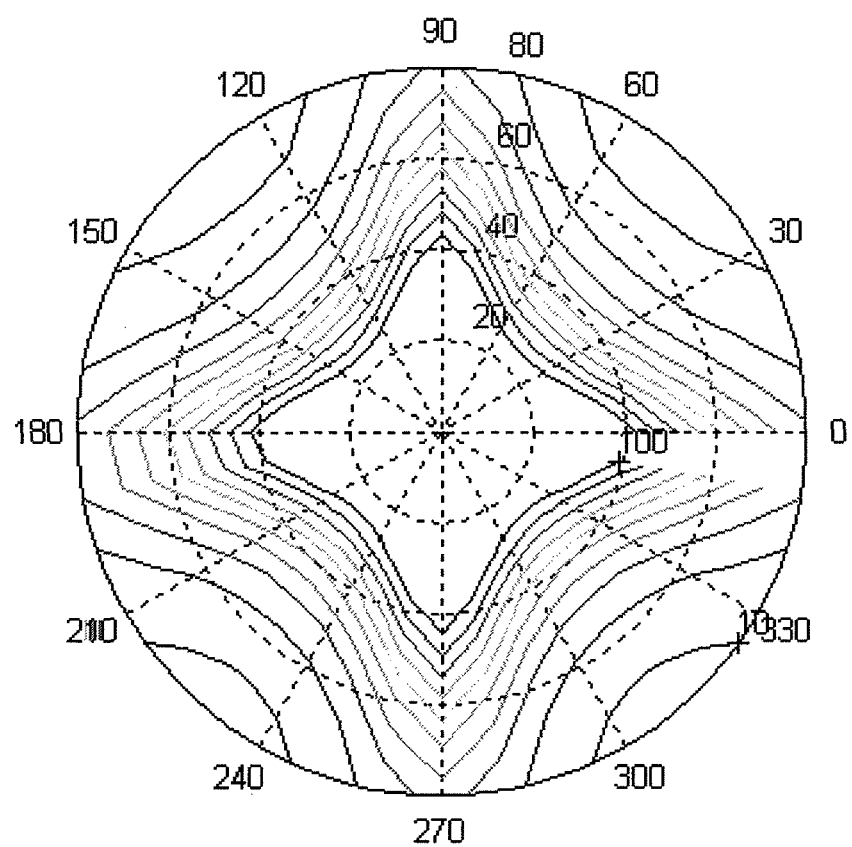
FIGS. 10A and 10B are graphs indicating a contrast ratio with respect to the left/right, top/bottom viewing angles at the wide and narrow viewing angle modes of the liquid crystal display device according to an embodiment of the present invention.
Figure 10B:
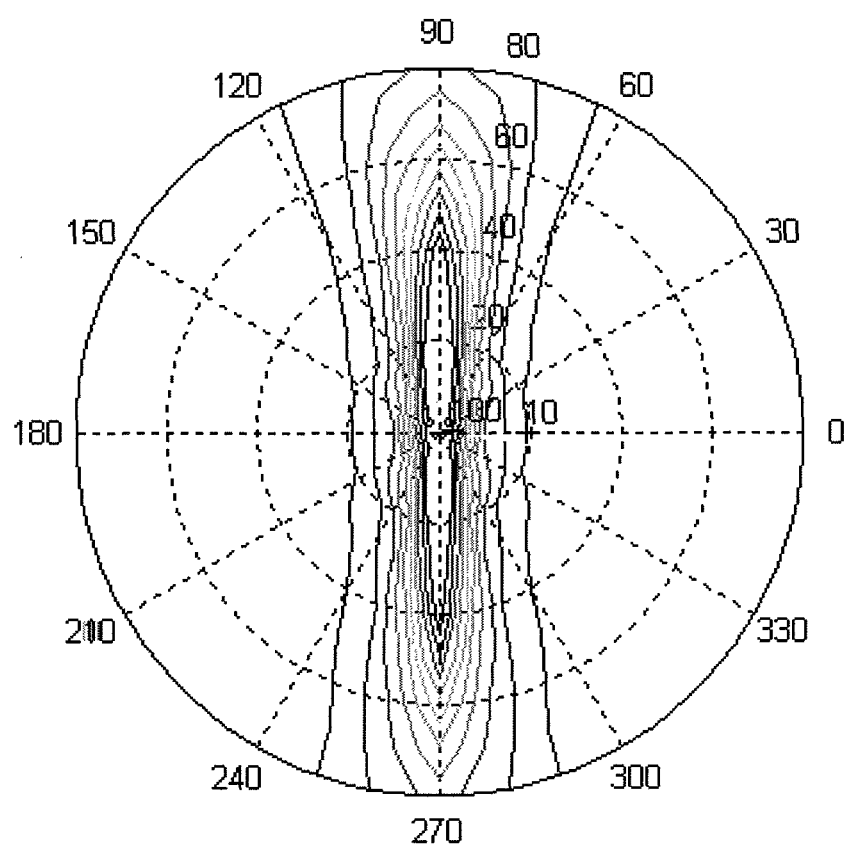

FIGS. 10A and 10B show the contrast ratio at the right/left and top/bottom oblique directions of the wide and narrow viewing angle modes. Referring to FIG. 10A, it shows that the range of viewing angle which has the contrast ratio of 10:1 is wide, although the brightness at the oblique direction is somewhat lower than that of the front direction. FIG. 10B shows the range of viewing angle which has the contrast ratio of 10:1 is narrowed.

The illustrated liquid crystal display device includes the first panel part (A) of the IPS mode which decides the darkness/brightness of the image and the second panel part (B) of the ECB mode which allows switching between the wide viewing angle mode and narrow viewing angle mode.

The dimension of the second panel part (B) of the ECB mode which operates the narrow viewing angle mode is as follows. When the cell gap of the second panel part (B) is 4 μm, the phase delay range is about 14~120 nm according to the tilt angle of the second liquid crystal layer 60 at the application of the vertical electric field to the second panel part (B). When the cell gap of the second liquid panel (B) is 3.4 μm, the phase delay range is about 14~120 nm according to the tilt angle of the second liquid crystal layer 60 at the application of the vertical electric field to the second panel part (B). The tilt angle range of the second liquid crystal layer 60 is between about 10° to 80° when the vertical electric field is applied to the second panel part (B). The reason to set the tilt angle of the second liquid is between about 10° to 80° is because it is difficult to have an effective narrow viewing angle as the light leakage may be too much if the tilt angle of the second liquid crystal layer 60 is below 10°. It is also difficult to have an effective narrow viewing angle at the range over 80° as the light leakage may be too much. In order to have the tilt angle range of the second liquid crystal layer 60 to be between about 10° to 80°, the operation voltage range ($\Delta v$) of the second panel part (B) to generate the vertical electric field should be about $1V < \Delta v \leq 4V$.

The ECB mode panel is applied as the second panel part which controls the viewing angle of the liquid crystal display device. Instead of applying the ECB mode panel as the second panel part, the OCB (Optical Controlled Birefringence) mode panel may be applied. The OCB mode panel includes at least one optical compensation film and has a higher manufacturing cost. It also requires large power consumption as a certain power needs to be applied to make the liquid crystal layer face each other in the middle of the liquid crystal layer at the initial stage of the liquid crystal alignment. In addition, the second panel part controlling the viewing angle can be formed at the upper or the lower side of the first panel part.

As described above, the illustrated liquid crystal display device allows switching between the wide viewing angle mode and the narrow viewing angle mode as it comprises the first panel part of the IPS mode which decides the darkness/brightness, and the second panel part of the ECB mode at the upper or lower part of the first panel part to allow switching between the wide and the narrow viewing angle modes.

The illustrated liquid crystal display device uses the IPS mode to provide a wide viewing angle range and uses the ECB mode to change the viewing angle range of the liquid crystal display device. Therefore, the manufacturing steps of the LCD are simplified.

It should be understood that the invention is not limited to the embodiments. Various changes or modifications can be made under the condition that those changes or modifications do not depart from the spirit of the invention. Accordingly, the scope of the invention shall be determined only by the appended claims and its equivalents.

What is claimed is:

1. A method for driving a liquid crystal display device, the method comprising:
   displaying a video image on a first panel by selectively applying a horizontal electric field to a first liquid crystal layer of the first panel of the liquid crystal display device; and
   selectively applying a vertical electric field to a second liquid crystal layer of the second panel of the liquid crystal display device,
   wherein when the vertical electric field is applied, a tilt angle of the second liquid layer is from 10° to 80°, a driving voltage for generating the vertical electric field is from 1V to 4V, and a phase delay range of the light passing the second layer is from 14 nm to 120 nm.

2. The method of claim 1, wherein the step of selectively applying the horizontal electric field includes applying a voltage between a pixel electrode and a common electrode of an in plane switching liquid crystal display panel.

3. The method of claim 1, wherein the step of selectively applying the vertical electric field includes applying a voltage between a first electrode and a second electrode of an electrically controlled birefringence liquid crystal display panel.

4. The method of claim 1, further comprising setting an initial alignment direction of the first liquid crystal layer to be parallel to an initial alignment direction of the second liquid crystal layer.

5. The method of claim 1, wherein the cell gap of the second panel is 3.4 μm or 4 μm.

6. A method for driving a liquid crystal display device, the method comprising:
   selectively applying a first electric field in a first direction on a first liquid crystal layer of the liquid crystal display device; and
   selectively applying a second electric field in a second direction on a second liquid crystal layer of the liquid crystal display device, the second direction being different from the first direction,
   wherein when the second electric field is applied, a tilt angle of the second liquid layer is from 10° to 80°, a driving voltage for generating the second electric field is from 1V to 4V, and a phase delay range of the light passing the second layer is from 14 nm to 120 nm.

7. The method of claim 6, wherein the first electric field is selectively applied on the first liquid crystal layer based on image data to be displayed on the liquid crystal display device.

8. The method of claim 6, wherein the second electric field is selectively applied on the second liquid crystal layer to change a viewing angle range of the liquid crystal display device.

9. The method of claim 6, wherein the second direction is substantially perpendicular to the first direction.

10. The method of claim 6, wherein the first direction is a horizontal direction and the second direction is a vertical direction.

11. The method of claim 10, wherein the step of applying the first electric field includes applying a voltage between a pixel electrode and a common electrode of an in plane switching liquid crystal display panel.

12. The method of claim 10, wherein the step of applying the second electric field includes applying a voltage between a first electrode and a second electrode of an electrically controlled birefringence liquid crystal display panel, wherein the first electrode and the second electrode face each other in the vertical direction.

13. The method of claim 6, further comprising setting an initial alignment direction of the first liquid crystal layer to be parallel to an initial alignment direction of the second liquid crystal layer.

14. The method of claim 6, wherein the cell gap of the second panel is 3.4 μm or 4 μm.

* * * * *